United States Patent
Bromand

(10) Patent No.: US 11,170,787 B2
(45) Date of Patent: Nov. 9, 2021

(54) VOICE-BASED AUTHENTICATION

(71) Applicant: Spotify AB, Stockholm (SE)

(72) Inventor: Daniel Bromand, Stockholm (SE)

(73) Assignee: Spotify AB, Stockholm (SE)

( * ) Notice: Subject to any disclaimer, the term of this patent is extended or adjusted under 35 U.S.C. 154(b) by 76 days.

(21) Appl. No.: 16/278,305

(22) Filed: Feb. 18, 2019

(65) Prior Publication Data

US 2019/0318744 A1 Oct. 17, 2019

(30) Foreign Application Priority Data

Apr. 12, 2018 (EP) .................................... 18167006

(51) Int. Cl.
*G10L 17/08* (2013.01)
*G10L 17/02* (2013.01)
*G10L 17/04* (2013.01)

(52) U.S. Cl.
CPC .............. *G10L 17/08* (2013.01); *G10L 17/02* (2013.01); *G10L 17/04* (2013.01)

(58) Field of Classification Search
CPC ......... G10L 17/00; G10L 17/04; G10L 17/02; G10L 17/08
USPC ....................................................... 704/246
See application file for complete search history.

(56) References Cited

U.S. PATENT DOCUMENTS

| | | | |
|---|---|---|---|
| 5,796,916 A | 8/1998 | Meredith | |
| 6,141,644 A | 10/2000 | Kuhn et al. | |
| 6,324,512 B1 | 11/2001 | Junqua et al. | |
| 6,343,267 B1 * | 1/2002 | Kuhn | G06K 9/6247 704/222 |
| 6,415,257 B1 * | 7/2002 | Junqua | G10L 17/00 704/275 |
| 6,701,292 B1 * | 3/2004 | Kawai | G10L 15/10 704/238 |
| 7,096,183 B2 | 8/2006 | Junqua | |

(Continued)

FOREIGN PATENT DOCUMENTS

| | | |
|---|---|---|
| EP | 1079615 A3 | 9/2002 |
| EP | 3196782 A1 | 7/2017 |

OTHER PUBLICATIONS

Koshore Prahallad: "Speech Tech: A Practical Introduction, Topic: Spectrogram, Cepstrum and Mel-Frequency Analysis", Carnegie Mellon Univ. & Int'l Inst. of Info. Tech. Hyderabad (2005).

(Continued)

*Primary Examiner* — Michael Colucci
(74) *Attorney, Agent, or Firm* — Merchant & Gould P.C.

(57) ABSTRACT

Voice-based authentication can include methods, systems, devices, and computer program products for providing user-specific services or access based at least in part on an utterance. In one method, an audio clip having an utterance is obtained. The utterance has an activation trigger portion and a command portion. A first distance between a vector representation of the activation trigger portion and a registered activation trigger vector is determined; and a second distance between a vector representation of the command portion and a registered command vector is determined. Responsive to the first distance satisfying a first distance threshold, and the second distance satisfying a second distance threshold, access is provided to a service associated with a registered user.

18 Claims, 11 Drawing Sheets

(56) References Cited

U.S. PATENT DOCUMENTS

| | | | |
|---|---|---|---|
| 7,567,896 B2 | 7/2009 | Coorman et al. | |
| 7,574,359 B2 | 8/2009 | Huang | |
| 8,798,777 B2 | 8/2014 | Mundy et al. | |
| 9,098,467 B1 | 8/2015 | Blanksteen et al. | |
| 9,548,979 B1 | 1/2017 | Johnson et al. | |
| 9,852,729 B2 | 12/2017 | Hoffmeister | |
| 2003/0113002 A1 | 6/2003 | Philomin et al. | |
| 2005/0004690 A1 | 1/2005 | Zhang et al. | |
| 2008/0127270 A1 | 5/2008 | Shipman et al. | |
| 2009/0100093 A1 | 4/2009 | Makipaa | |
| 2011/0055256 A1* | 3/2011 | Phillips | G10L 15/30 707/769 |
| 2012/0280783 A1* | 11/2012 | Gerhardt | H04W 12/08 340/5.6 |
| 2014/0163978 A1* | 6/2014 | Basye | G10L 15/28 704/233 |
| 2015/0301796 A1 | 10/2015 | Visser et al. | |
| 2016/0086609 A1* | 3/2016 | Yue | G10L 15/22 704/239 |
| 2016/0342594 A1 | 11/2016 | Jehan | |
| 2017/0110144 A1 | 4/2017 | Sharifi et al. | |
| 2017/0270907 A1 | 9/2017 | Mori | |
| 2017/0351487 A1* | 12/2017 | Aviles-Casco Vaquero | G06F 3/167 |
| 2018/0005628 A1 | 1/2018 | Xue | |
| 2018/0012593 A1 | 1/2018 | Prasad et al. | |
| 2018/0033436 A1* | 2/2018 | Zhou | G10L 15/22 |
| 2018/0033438 A1* | 2/2018 | Toma | G10L 17/00 |
| 2018/0277111 A1* | 9/2018 | Nakagome | G10L 25/78 |
| 2019/0304443 A1* | 10/2019 | Bhagwan | G10L 15/22 |
| 2019/0311722 A1* | 10/2019 | Caldwell | G10L 17/02 |

OTHER PUBLICATIONS

Van den Oord: "Wavenet: A Generative Model for Raw Audio", arXiv preprint arXiv:1609.03499 (2016).
Svetlana Lazebnik: "Face detection and recognition", Available at: www.cs.unc.edu/~lazebnik/spring09/lec22_eigenfaces.pdf (2009).
Extended European Search Report from European Application No. 18167006.8, dated Oct. 23, 2018.
European Office Action for EP Appln. No. 18186916.5 dated Dec. 8, 2020 (6 pages).

* cited by examiner

VOICE-BASED AUTHENTICATION

CROSS-REFERENCE TO RELATED APPLICATION

This application claims priority to European Patent Application No. 18167006.8, titled "VOICE-BASED AUTHENTICATION", filed on Apr. 12, 2018. This priority application is incorporated by reference herein in its entirety.

TECHNICAL FIELD

The present disclosure relates to technical solutions for providing user-specific services and access based on an utterance, such as associating a hardware device or software with an account based on user voice input.

BACKGROUND

The process of providing user-specific services or access often involves a user providing a username and password; traditionally using a tactile or virtual keyboard. But, there are drawbacks and challenges with this process: not all devices have a keyboard (e.g., voice-first devices), not all keyboards are available for use (e.g., for attention or accessibility reasons), and username-password combinations are not always ideal for authentication, among others. Login difficulties can be compounded by frequent switching of accounts (e.g., among family members sharing a device or when providing guest access).

Authentication via user utterances (e.g., voice print) is one possible solution, though it suffers from technical drawbacks. Authentication via utterances is fraught with technical hurdles due to dichotomy between the desires for speed and ease of use, on the one hand, and the desire for security and accuracy, on the other. Techniques that increase speed and ease of use often also decrease security and accuracy of the system. Similarly, techniques that improve security and accuracy often reduce speed and ease of use. It is desirable to provide user-specific services or access in a manner that addresses one or more drawbacks of existing solutions for providing user-specific services or access.

U.S. Pat. No. 6,141,644 describes a system for speaker verification and identification based on eigenvoices. Speech models are constructed and used to create an eigenspace. New speech data is placed into the eigenspace, and the proximity in eigenspace of the new speech data to training data serves to authenticate or identify a speaker of the new speech data. The system does not require that the new speech data include every utterance that was in the training data.

U.S. Pat. No. 9,098,467 describes a system for accepting voice commands based on user identity. There is an identification engine that compares voice prints of speech, which are described as being based on aspects including pitch, frequency, volume, a location of users that uttered the speech, grammar, and choice of words.

US 2015/0301796 describes a device that performs speaker verification based on a speaker model. An input audio is received and a processor determines confidence levels for portions of audio signal; and, based thereon, a display presents a graphical user interface.

SUMMARY

The present disclosure provides methods, apparatuses, and computer-readable products for associating a hardware device or software with an account based on user voice input.

In an example, there is a method that includes: obtaining, from a store, an audio clip having an utterance having an activation trigger portion and a command portion; determining an activation trigger vector distance between an activation trigger vector representation of the activation trigger portion and a registered activation trigger vector; determining a command vector distance between a command vector representation of the command portion and a registered command vector; and responsive to the activation trigger vector distance satisfying an activation trigger distance threshold and the command vector distance satisfying a command vector distance threshold, providing service or access associated with a registered user.

In an example, the method further includes: during a registration process, obtaining a registration audio clip having a registration utterance from the registered user; segmenting the registration utterance into a registered activation trigger portion and a registered command portion; creating the registered activation trigger vector from the registered activation trigger portion; creating the registered command vector from the registered command portion; and storing the registered activation trigger vector and the registered command vector in association with the registered user. In an example, obtaining the audio clip having the utterance includes: monitoring an output from an audio input device; and responsive to the output matching an activation trigger pattern, creating the audio clip having the utterance. In an example, the method further includes obtaining a training set; representing the training set as feature vectors to form a plurality of feature vectors; performing singular value decomposition on the plurality of feature vectors to obtain eigenvoices; creating the activation trigger vector representation of the activation trigger portion using one or more of the eigenvoices; and creating the command vector representation of the command portion using one or more of the eigenvoices. In an example, the method further includes: storing the registered activation trigger vector; storing the registered command vector; providing the audio clip having the utterance to a server; receiving the activation trigger vector representation of the activation trigger portion from the server; and receiving the command vector representation of the command portion from the server. In an example providing service or access associated with the registered user includes obtaining credentials associated with the registered user from an account data store. In an example, the method further includes receiving the audio clip having the utterance from a device over a network. In an example, providing service or access associated with the registered user includes providing credentials to the device. In an example, the method further includes segmenting the audio clip into the activation trigger portion and the command portion. In an example, the method further includes creating the activation trigger vector representation of the activation trigger portion from the activation trigger portion; and creating the command vector representation of the command portion from the command portion. In an example, the method further includes providing the activation trigger vector representation and the command vector representation to the device. In an example, the determining the activation trigger vector distance is performed at the device; and wherein the determining the command vector distance is performed at the device. In an example, the method further includes selecting an activation trigger vector space model from multiple possible vector space models based on the activation trigger portion in the utterance; and creating the activation trigger vector representation using the activation trigger vector space model. In an example, the method further includes selecting a command vector space model from multiple possible vector space models based on the command portion in the utterance; and creating the command vector representation using the command vector space model.

In an example, there is a system that includes one or more processors; and a computer-readable medium coupled to the one or more processors and comprising instructions thereon that, when executed by the one or more processors, cause the one or more processors to perform any of the previously-described methods.

BRIEF DESCRIPTION OF THE DRAWINGS

The features and advantages of the present disclosure will become more apparent from the detailed description set forth below when taken in conjunction with the following drawings.

DETAILED DESCRIPTION

The example embodiments presented herein are directed to systems, methods, and non-transitory computer-readable medium products for providing user-specific service or access based on an utterance, which can include associating a hardware or software product with an account based on an utterance. This is for convenience only, and is not intended to limit the application of the present invention. After reading the following description, it will be apparent to one skilled in the relevant art how to implement the following disclosure in alternative embodiments.

Providing user-specific service or access takes a variety of different forms. In one example, providing user-specific service involves providing services associated with a particular account, such as virtual-assistant services associated with the particular account; so when a user asks for "what are today's top stories?", the virtual assistant behaves in a manner customized to the user's account, such as by reading the top stories from sources stored in association with the account in a voice selected by the user (e.g., a synthetic voice having properties stored in association with the account, such as a particular accent). In another example, the service is a streaming music service, and providing user-specific service involves selecting and playing songs based on that user's taste profile. Providing user-specific access can involve allowing the currently-speaking user to access user-specific data, such as the user's files. For example, if the user asks "what's the next event on my calendar?", the device accesses that user's calendar data and replies with the next event on the calendar.

System for Providing User-Specific Services or Access Based on an Utterance

Figure 1:
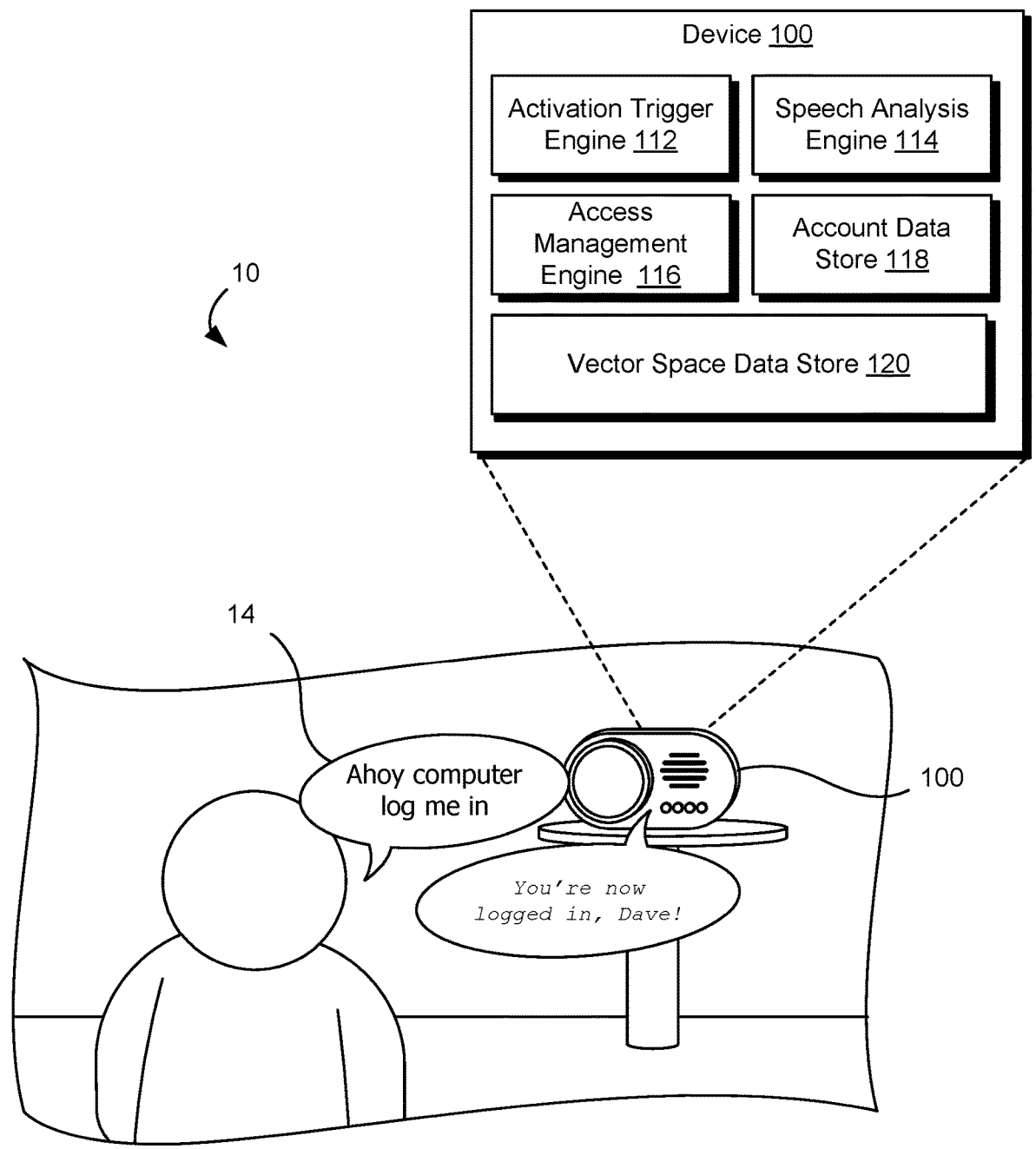
FIG. 1 illustrates an example system for providing user-specific services or access based on an utterance received at a device.

FIG. 1 illustrates an example system 10 for providing user-specific services based on an utterance received at a device 100. System 10 can also provide access to an account associated with such user-specific services based on an utterance received at a device 100. In the illustrated example, the device 100 is a smart audio appliance for playing media content items that is controlled using a voice-based user interface. The device 100 is controlled using voice commands, such as utterance 14. Utterance 14 is a speech statement received at the device 100. Utterances and a voice-based user interface are further described in relation to FIG. 3 and FIG. 4, respectively.

In the example system 10, the user directs the utterance 14, "ahoy computer log me in", at the device 100. The utterance 14 includes several portions, including an activation trigger portion ("ahoy computer"), a command portion ("log . . . in") and a parameter portion ("me"). The device 100 uses features extracted from the utterance 14 to provide user-specific services or access.

As illustrated, the device 100 includes an access management engine 116, an account data store 118, and a vector space data store 120 configured to store at least one vector space data structure. The device 100 uses components 116, 118, 120 (among others) to analyze the utterance 14 to extract features or characteristics of the utterance. Using at least some of these characteristics or features, the device 100 provides services or access specific to the user. For example, in response to the command to "log me in", the device 100 determines a user associated with the utterance using one or more of the techniques described herein. With the user determined, the device 100 associates itself with the user, such as by storing user credentials, accessing stored user credentials, updating a data structure, or logging into a user account, among others.

In some embodiments, the device 100 uses the activation trigger engine 112 and the speech analysis engine 114 to provide a voice-based user interface. The activation trigger engine 112 detects an activation trigger within the utterance 14. Responsive to detecting the activation trigger, the activation trigger engine 112 provides at least a portion of the utterance to the speech analysis engine 114 for additional analysis.

The additional analysis includes cooperating with the access management engine 116 to determine a user or account associated with the speaker of the utterance 14. For instance, the access management engine 116 represents the utterance 14 in a vector space based on the vector space data structure stored in vector space data store 120. The access management engine 116, in turn, determines one or more distances in vector space between the utterance 14 and a similar utterance spoken by one or more authorized users. If the distance from a particular authorized user to the utterance 14 in vector space is within a predetermined threshold, then the access management engine 116 determines that the speaker of the utterance 14 is addressing the device 100. In response, the access management engine 116 provides services or access specific to the authorized user.

Providing services or access specific to the authorized user involves, for example, the access management engine 116 accessing (e.g., decrypting) credentials associated with an authorized user in the account data store 118. The device 100 uses the credentials to access one or more services or data structures on behalf of the user. In an example, the device 100 uses the credentials to communicate with a server. For instance, where the device 100 is a smart audio appliance that streams audio from a server, the device 100 accesses the server with the credentials and provides audio output associated with the user's account (e.g., songs associated with a taste profile of the account). In another instance, the device 100 provides access to files associated with the device 100 to the user (e.g., allowing a user to listen to messages stored in memory of the device 100). Further, the device 100 can disallow access to data or services of other users.

Figure 2:
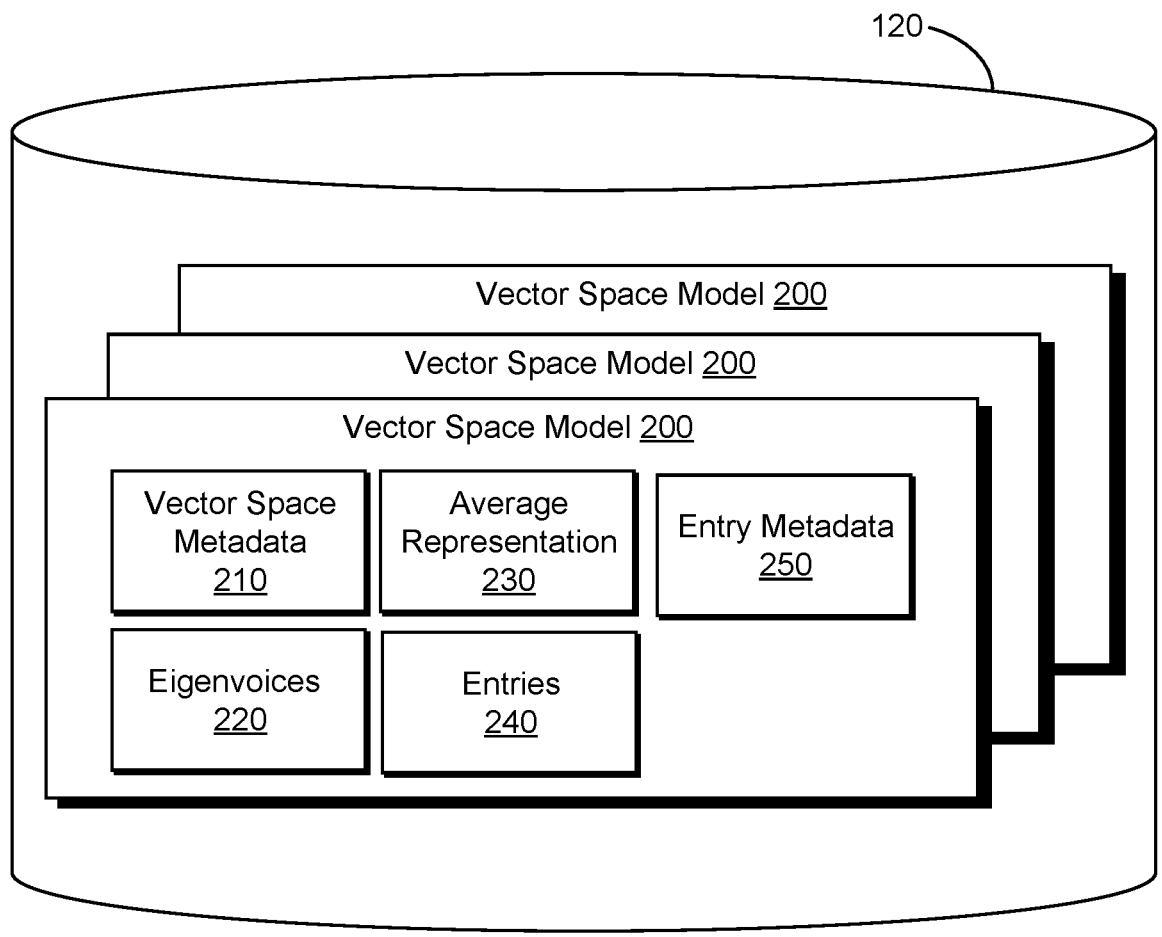
FIG. 2 illustrates an example vector space data store that stores vector space models.

FIG. 2 illustrates an example vector space data store 120 that stores vector space models 200. Each vector space model 200 includes one or more data structures that define data in relation to a vector space. In the illustrated example, each vector space model 200 includes vector space metadata 210, eigenvoices 220, average representation 230, entries 240, and entry metadata 250. The vector space metadata 210 includes a variety of different kinds of data regarding the vector space model 200, such as information regarding how the vector space model was created, such as a number of training samples used to create the vector space model, a version number, a date created, and other kinds of data. In an example, the vector space metadata 210 also includes an utterance associated with the vector space model 200, such as an utterance (e.g., text data associated with one or more utterances) used during the creation of the vector space model. For instance, the vector space model 200 can be a first vector space model created based on utterances of the phrase "ahoy computer", and there can be a second vector space model created based on the utterances of the phrase "log me in". The vector space metadata 210 of the respective vector space models 200 stores the data regarding these utterances.

The illustrated vector space model 200 further includes one or more eigenvoices 220 and an average representation 230. Eigenvoices and average representations are described in greater detail below, including in relation to FIG. 6.

The illustrated vector space model 200 further includes one or more entries 240 and associated entry metadata 250. The entries 240 are representations of utterances or other data in a vector space associated with the vector space model 200, such as by being defined in relation to the eigenvoices 220 and entry metadata 250. An example process for creating one or more entries is described in relation to FIG. 7 and FIG. 9.

The illustrated vector space model 200 further includes entry metadata 250. The entry metadata 250 includes information associated with each of the one or more entries 240. In an example, an entry associated with a registered user saying the phrase "ahoy computer" includes the entry metadata 250 describing information regarding the registered user, such as credentials associated with the user, login information and associate with the user, the user's name, and other information.

The vector space model 200 can be defined or used in relation to utterances received at the device 100 as part of a voice-based user interface.

Voice-Based User Interface

Software or hardware products that provide a voice-based user interface are configured to take action in response to utterances.

Figure 3:
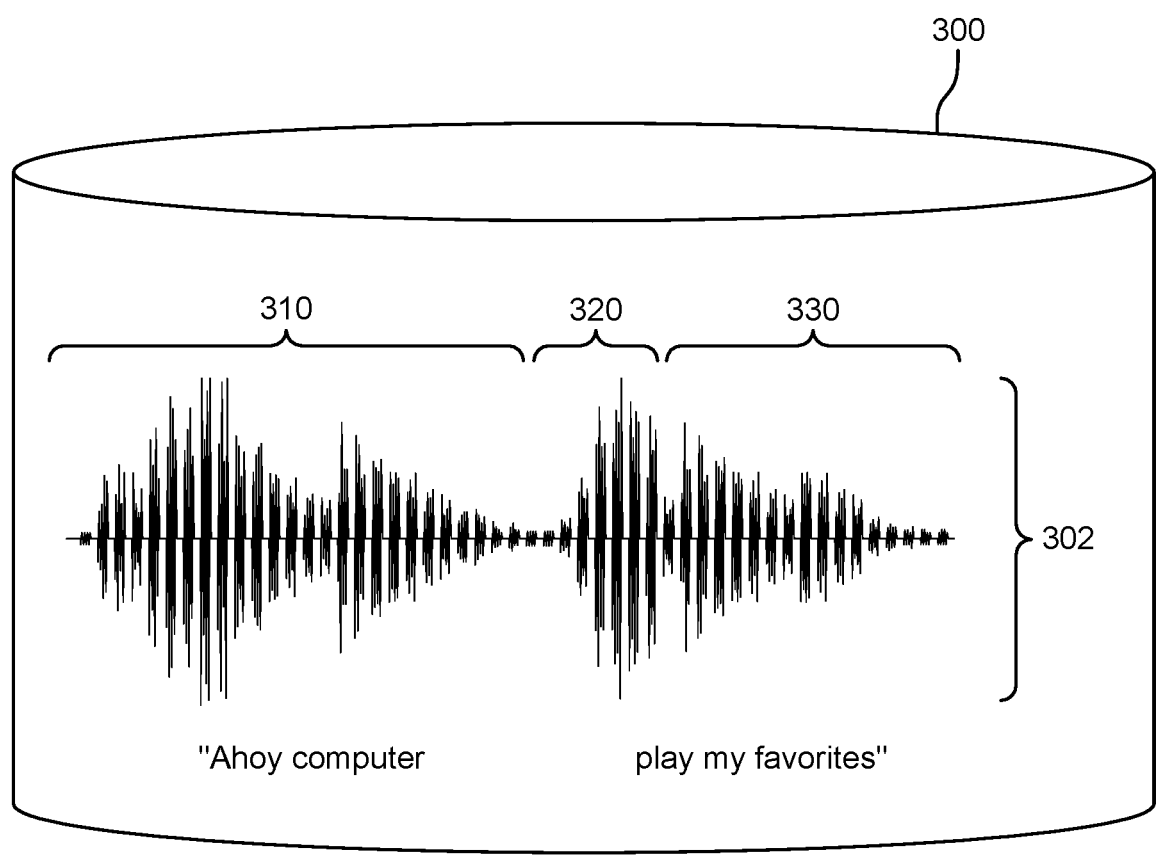
FIG. 3 illustrates an example utterance stored in a data store.

FIG. 3 illustrates an example utterance 302 stored on store 300 (e.g., temporary memory). This utterance 302 includes an activation trigger portion 310, a command portion 320, and a parameter portion 330. In the illustrated example, the activation trigger portion 310 corresponds the phrase "ahoy computer", the command portion 320 corresponds to the phrase "play", and the parameter portion 330 corresponds to the phrase "my favorites".

The device 100 receives the utterance 302. Responsive to the activation trigger engine 112 detecting the activation trigger portion 310, the activation trigger engine 112 provides at least a portion of the utterance 302 to the speech analysis engine 114. The speech analysis engine process some or all of the utterance 302 and identifies one or more of the various portions 310, 320, 330.

Identifying the portions of the utterance 302 can be performed using a variety of techniques. In one example, segmenting the utterance 302 into constituent portions is based on the text content of the utterance (e.g., splitting on words or natural-language processing of the text content of the utterance). In another example, segmenting is based on how the utterance 302 was uttered (e.g., by splitting the utterance based on pauses in the utterance), among other techniques.

Where the speech analysis engine 114 determines that the utterance 302 includes the command portion 320, the speech analysis engine 114 determines a command associated with the command portion 320 (e.g., using natural language processing, look-up tables, or other techniques). Where the utterance 302 includes a parameter portion 330, the speech analysis engine 114 determines the parameters described by the parameter portion 330. The determined command is then executed using the determined parameters. Based on the output of the executed command, the device generates a response or confirmation for the user or takes another action.

Voice-based user interfaces use one or more activation triggers to activate one or more capabilities of an associated device. In many instances, an activation trigger is a predetermined word or phrase spoken by the user to activate a voice-based user interface. In some instances, the activation trigger is formed or detected as particular sound data above or below the threshold of human hearing. In other instances, the activation trigger is an electronic signal received by a device in response to an event, such as actuation of a button or other user input mechanism. In still other instances, the event includes a signal received from another device.

The activation trigger portion 310 serves several purposes, including overcoming challenges in voice-based user interfaces. Voice-based user interfaces generally operate by obtaining audio input from an ambient environment and appropriately responding to detected speech. As such, voice-based user interfaces receive all utterance in the ambient environment, including utterances not directed to the user interface. The detection of utterances not directed to the interface can present drawbacks. The use of an activation trigger provides several technical advantages, including conserving resources and protecting user privacy.

Speech analysis (e.g., speech-to-text and natural language processing) in voice-based user interfaces is a relatively resource intensive process, including computing resources such as processor cycles, memory resources, power, network resources, combinations thereof, or other resources. Performing speech analysis on audio that a user does not want processed (e.g., speech not directed to the device) is wasteful of computing resources. In addition, activation triggers protect user privacy. Many users are wary of a device that is always listening. Limiting speech analysis to situations in which the device is activated addresses user concerns relating to privacy. In addition, activation triggers reduce the risk of a voice-based user interface responding when it is not being addressed. So benefits arise from a speech analysis engine operating in a default, inactive mode and then transitioning to an active mode responsive to an activation trigger engine determining that an utterance includes an activation trigger.

Utterances usable by a voice-based user interface need not include all three of these portions. For instance, the utterance "hey computer, preset one", includes an activation trigger portion ("hey computer") and a parameter portion ("preset one"), but not a command portion. The device 100 receiving the utterance can nonetheless infer the presence of a command based on the parameters, natural language processing, or a context in which the utterance was provided. In another example, a user can speak the utterance "ahoy computer", wait for the device to provide a confirmation that it is listening, and then provide a command as part of a separate utterance (e.g., "what song were you just playing?").

Figure 4:
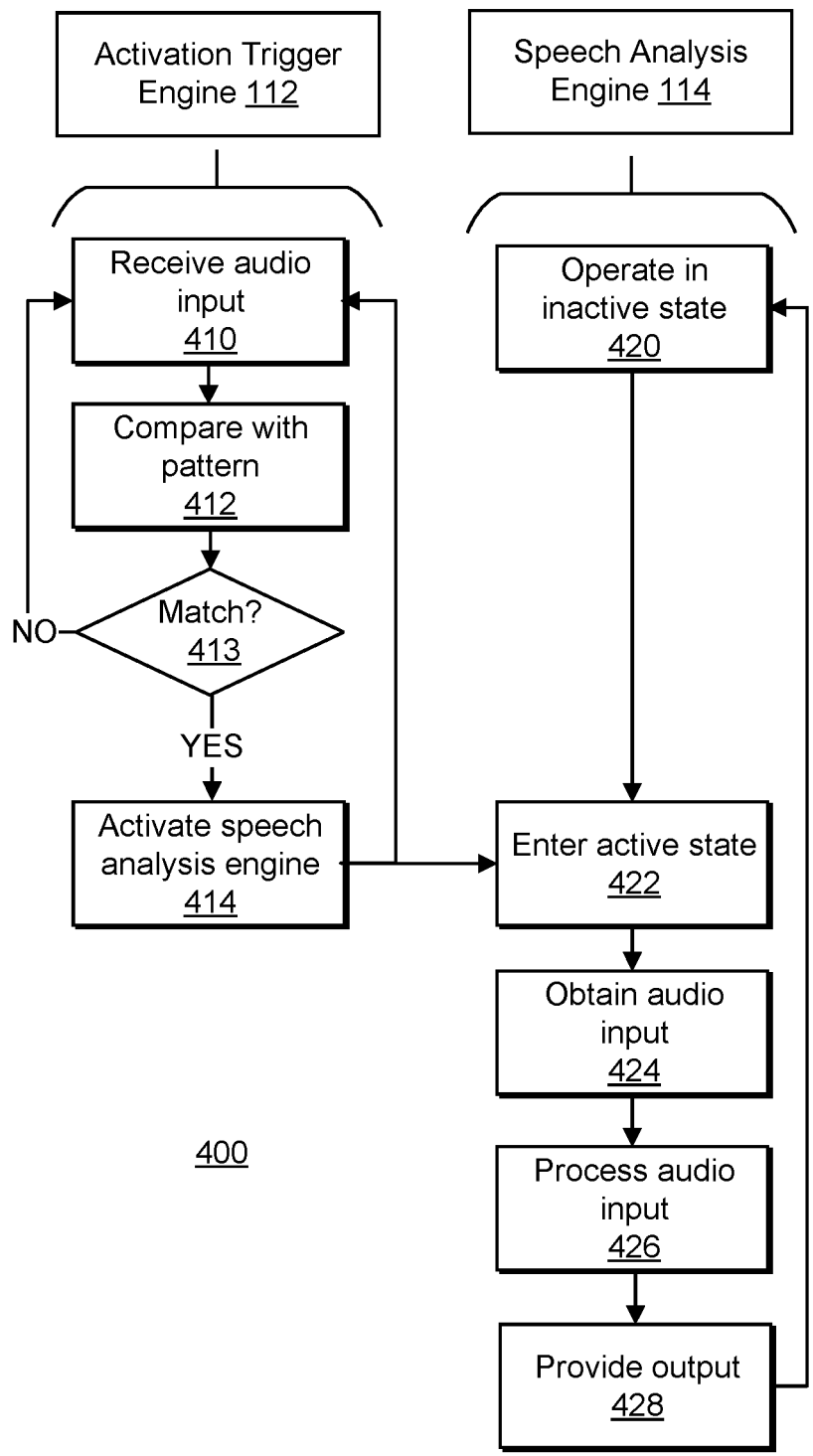
FIG. 4 illustrates an example flow diagram showing a process for providing a voice-based user interface using the activation trigger engine and the speech analysis engine.

FIG. 4 illustrates an example flow diagram showing a process 400 for providing a voice-based user interface using the activation trigger engine 112 and the speech analysis engine 114. The process 400 begins at operation 410, which involves the activation trigger engine 112 receiving audio input. For instance, the activation trigger engine 112 receives audio input from a microphone of the device 100 or a connection to an external audio source (e.g., a Bluetooth connection to a device that has a microphone). In some instances, the audio input is streaming audio input. In some instances, the audio input includes discrete slices of audio samples or chunked input. As will be understood, various portions of process 400 can occur simultaneously, and various buffers or caches can be used to facilitate the comparison of data over time. In an example, the operation 410 includes monitoring an output from an audio input device.

In operation 412, the activation trigger engine 112 compares the audio input with one or more patterns to determine if the audio input includes an activation trigger. The obtained audio input can include utterances that are directed to the device 100, utterances directed to another target (e.g., another person in the room), ambient room noise, or other sounds. A variety of different techniques can be used to determine if the audio input includes an activation trigger.

In one example, features are extracted from the audio input and provided to a machine learning framework configured to determine the confidence level that the extracted features correspond to an activation trigger. Audio data, in general, and human speech data, in particular, contain large amounts of data features. It can be advantageous to focus on features that are particularly helpful to the task at hand, which in this case are features relevant to detection of an activation trigger. Various techniques can be used for feature extraction. In some examples, mel-frequency cepstrum representation of audio data is used to generate cepstral coefficients features for processing. In other examples, mel-frequency cepstral coefficients, log filter banks, cepstral analysis, or other techniques are used.

In another example, feature extraction is performed using invertible feature extraction (e.g., using Fourier transforms). For instance, instead of relying on features or parameters only from a time domain of a signal, the signal is transformed into a frequency domain using Fourier transformation. Parameters are then extracted from the frequency domain.

Once extracted, the extracted features are analyzed to determine a similarity with a pattern associated with an activation trigger. This analysis can be performed through a variety of techniques including, but not limited to, hidden Markov models, neural networks, and other techniques. In many instances, the activation trigger engine 112 includes a pre-trained or pre-generated pattern against which to compare the features.

At operation 413, if the received audio input matches the pattern, then the flow of the process moves to operation 414. If the received audio input does not match the pattern, the flow of the process 400 moves back to operation 410. In an example, the audio input matches the pattern if a difference between the features of the audio input and the pattern satisfies a threshold. The process of operations 410, 412, and 413 can be referred to as monitoring the output of an audio input device for an activation trigger pattern. Once a match is detected, the flow simultaneously moves to operation 414 and the monitoring continues.

At operation 414, the activation trigger engine 112 causes the speech analysis engine 114 to be activated. For instance, previously the speech analysis engine 114 was operating in an inactive state in operation 420. The inactive state can take a variety of different forms. In some instances, the speech analysis engine 114 includes a resource-intensive process for analyzing speech input and, while the speech analysis engine 114 is operating in the inactive state, the process is not running. In another example, the speech analysis engine 114 is configured to perform analysis on data within a queue and that queue may be empty. In still other examples, the speech analysis engine 114 operates in an inactive state with respect to the activation trigger engine 112. For instance, the speech analysis engine 114 is located on a device remote from the activation trigger engine 112, such as at a server.

Returning to operation 414, the activation trigger engine 112 can activate the speech analysis engine 114 in a variety of ways, such as sending a signal to the speech analysis engine 114, executing a command, accessing an application programming interface associated with the speech analysis engine 114, populating a queue with data, or piping output of a recording device or process to the speech analysis engine 114, among other techniques. In an example, operation 414, includes responsive to the audio output from an audio input device matching an activation trigger pattern in operation 413, creating an audio clip having an utterance.

At operation 422, the speech analysis engine 114 enters an active state. This operation 422 takes a variety of different forms depending on the implementation of speech analysis engine 114. In general, entering the active state involves the speech analysis engine 114 analyzing input data or preparing to analyze input data, such as is described in operations 424, 426 and 428.

In operation 424, the speech analysis engine 114 obtains the audio input data. In some examples, this includes some or all of the audio input data received in operation 410. For instance, the activation trigger engine 112 buffers the audio input data obtained and, when the audio input data is determined to match an activation trigger pattern, the contents of the buffer are provided to the speech analysis engine 114 for analysis. In such instances, the audio input obtained in operation 424 includes the activation trigger portion (e.g., activation trigger portion 310 as in utterance 302 of FIG. 3) in addition to other portions that the speech analysis engine processes (e.g., the command portion 320 and the parameter portion 330 as in utterance 302 of FIG. 3). Once the audio input data is provided to the speech analysis engine 114 or a threshold amount of time passes, the buffer is cleared. In other instances, the activation trigger engine 112 provides or redirects audio obtained after detection of the activation trigger to the speech analysis engine 114. In such instances, the speech analysis engine 114 obtains audio input data for a portion of an utterance following the activation trigger portion but not the activation trigger portion itself. In some instances, the audio input is "raw" audio data. In other instances, the audio input includes features extracted from the audio data.

After receiving at least a portion of the audio input, the speech analysis engine 114 performs operation 426, which involves processing the audio input data. Processing audio input takes a variety of different forms. In many examples, processing audio input involves performing speech-to-text transcription of the audio input. In other examples, processing audio input involves determining an intent associated with the utterance. For instance, if the speech analysis engine 114 were processing the utterance 302 as audio input, the speech analysis engine 114 performs speech-to-text transcription on the utterance 302 to determine that the audio input data corresponds to the text "hey computer play my favorites". In other instances, the speech analysis engine 114 processes the utterance 302 to determine that intent behind the utterance is to cause playback from a context called "my favorites".

At operation 428, the speech analysis engine 114 provides output based on the processing in operation 426. As will be understood, the output is based on the type of processing performed. In some instances, the output or audio data is provided to another analysis or processing engine for further processing, such as text analysis, natural language processing, emotion detection, or other processing. In other instances, that additional processing is performed by the speech analysis engine 114 in operation 426, and the results of that additional processing can be provided.

In some examples, the speech analysis engine 114 determines that the user's intent is to access personalized services on the device 100. For example, responsive to a user saying "ahoy computer log me in", the process 400 may provide an output indicating that a login command should be executed.

A login process involves a variety of different steps, depending on the implementation. In some examples, the login process involves a user supplying credentials to the device, which are then used to access one or more services on the user's behalf. In other examples, the device already stores in memory the credentials of one or more authorized users. For instance, such credentials are stored in an encrypted format in an account data structure stored in the account data store 118. The credentials are then unlocked, responsive to determining that an authorized user is requesting access, and the credentials are then used. In general, the various techniques for logging in or authorizing users include processes for providing user-specific services or access, or associating a software or hardware product with a user's account.

As previously discussed, there are a number of drawbacks and technical challenges involved in processes for providing user-specific services or access. In an example technique for the device 100 providing user-specific services or access based on the utterance 14, processing is performed on the utterance 14 to determine whether the utterance 14 likely came from a registered user (and which registered user, in particular) or someone else. Features of the utterance 14 are used to determine the potential source of the utterance. If the source is likely to be a registered user, then the device 100 operates in a mode with respect to that user, such as by accessing services associated with the user.

User-Specific Access or Services Based on Vector Space Representations of Utterances At least some example techniques disclosed herein use vector space representations of utterances to determine whether an utterance was spoken by a registered user. Disclosed techniques can also use vector space representations of utterances to determine whether the speaker is a registered user and, in the case of many registered users, which registered user spoke the utterance. In an example, the device 100 is a smart audio appliance shared by members of a family. It would be beneficial for each family member to be able to easily use the device 100 to access their specific audio streaming preferences because the family members prefer to play audio from their own accounts (e.g., which stores their playlists, taste profiles, and other user-specific data) rather than the account of another or via a shared account. The members provide an utterance, which is then analyzed by the device 100. Based on the output of the analysis, the device 100 uses various accounts of registered users.

Providing user-specific access to utterances provides the technical benefit of improving a voice-based user interface by improving the ability of a user to quickly and easily interact with the interface. Providing access based on features of an utterance also provides this benefit as well as increased security and privacy; rather than, for example, a user speaking out loud a user name and password (e.g., which may be overheard by someone else), the user provides a general utterance (e.g., "ahoy computer log me in") that does not overtly contain sensitive information but which nonetheless carries sufficient identifying information for the device to determine an identity of the speaker.

Figure 5:
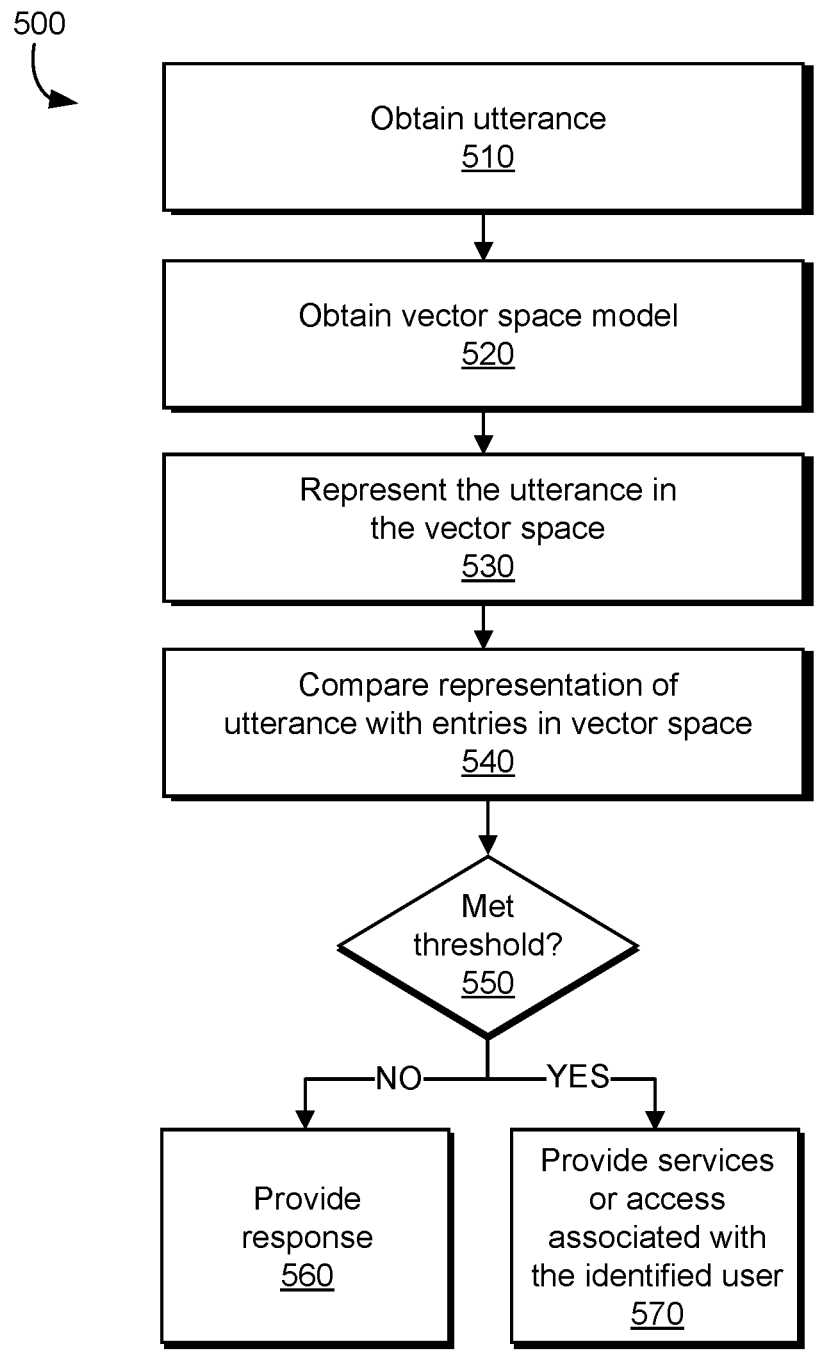
FIG. 5 illustrates an example process for the device to provide user-specific services or access based on an utterance.

FIG. 5 illustrates an example process 500 for the device to provide user-specific services or access based on an utterance. In an example, the process 500 is performed in whole or in part by the access management engine 116 in cooperation with other components of the device 100. The process 500 begins with operation 510.

At operation 510, an utterance is obtained. The utterance can be obtained in a variety of ways. For example, the speech analysis engine 114 determines that an audio input obtained by the device 100 and provided to the speech analysis engine 114 includes an utterance having a command portion corresponding to a login, authorization, association, switch user, or other command. Example utterance formats include audio files, streaming audio, and feature representation of an utterance, among others. In other examples, the access management engine 116 performs the process 500 on each utterance received by the device 100 and not just on access management (e.g., login, log out, or switch user) commands.

At operation 520, one or more vector space models are obtained. For example, the access management engine 116 accesses vector space models stored locally or remotely from the device (e.g., vector space data structure stored in vector space data store 120). In other examples, the access management engine 116 generates the vector space data structure or portions thereof (see, e.g., FIG. 6 and associated disclosure).

Vector space models can be utterance-specific. An example device 100 includes a vector space model corresponding to an "ahoy computer" utterance, a "hey computer utterance", an "ahoy", and a "log me in" utterance, among others. In some examples, specific vector space models are selected based on characteristics of the input. This involves, for instance, performing speech-to-text conversion on the utterance and determining whether one or more portions of the resulting text corresponds to a vector space. In other examples, the vector space models are not selected using characteristics of the input and instead a general battery of vector space models are obtained for use.

At operation 530, the access management engine 116 represents the utterance in a vector space. Representing an utterance in vector space includes, for instance, extracting features from audio input and storing the features in a vector format associated with the vector space. In an example, each vector space includes a schema defining how to represent data within the vector space. An example process for creating the vector space model is provided in relation to FIG. 6.

In some instances, the entire utterance is represented in a single vector space. In other instances, the utterance is segmented into multiple portions and each of those portions are represented in separate vector spaces. The segmenting can be performed in a variety of ways including using speech-to-text analysis, segmenting on pauses, and other techniques.

At operation 540, the vector space representation of the utterance (or portions thereof) is compared against entries in one or more vector space models. Among the entries are entries associated with registered users. For instance, during a set up process, a user is asked to login to the device and then provide one or more utterances of an activation trigger and command that are stored for future use. The representation is compared against the one or more entries in vector space, such as by calculating a Euclidian distance between the representation and the entries. In other examples, statistical comparisons of the relative similarities and differences between the representation and the entries are calculated.

At operation 550, the access management engine 116 determines whether the representation of the utterance is sufficiently similar or different from the one or more entries in the vector space. In an example, a distance threshold value is used and if the distance is sufficiently small (e.g., less than or equal to the distance threshold value), then the threshold is considered to be met. If the threshold is met, then the flow moves to operation 570, otherwise, the flow moves to operation 560.

In operation 560, a response is provided. If the threshold is not met, then the device takes actions associated with receiving an utterance associated with an unregistered user, such as by providing a generic response (e.g., providing widely enjoyed songs in response to the utterance "ahoy computer, play something good"), or denying use of the device (e.g., locking the device or ignoring the request), providing a notification (e.g., an audio, visual, or other indication), among others. In an example, the device generates a notification that directs the user to try again. Other example responses include the device providing the user with guest access to the device, or inviting the user to register an account.

Figure 6:
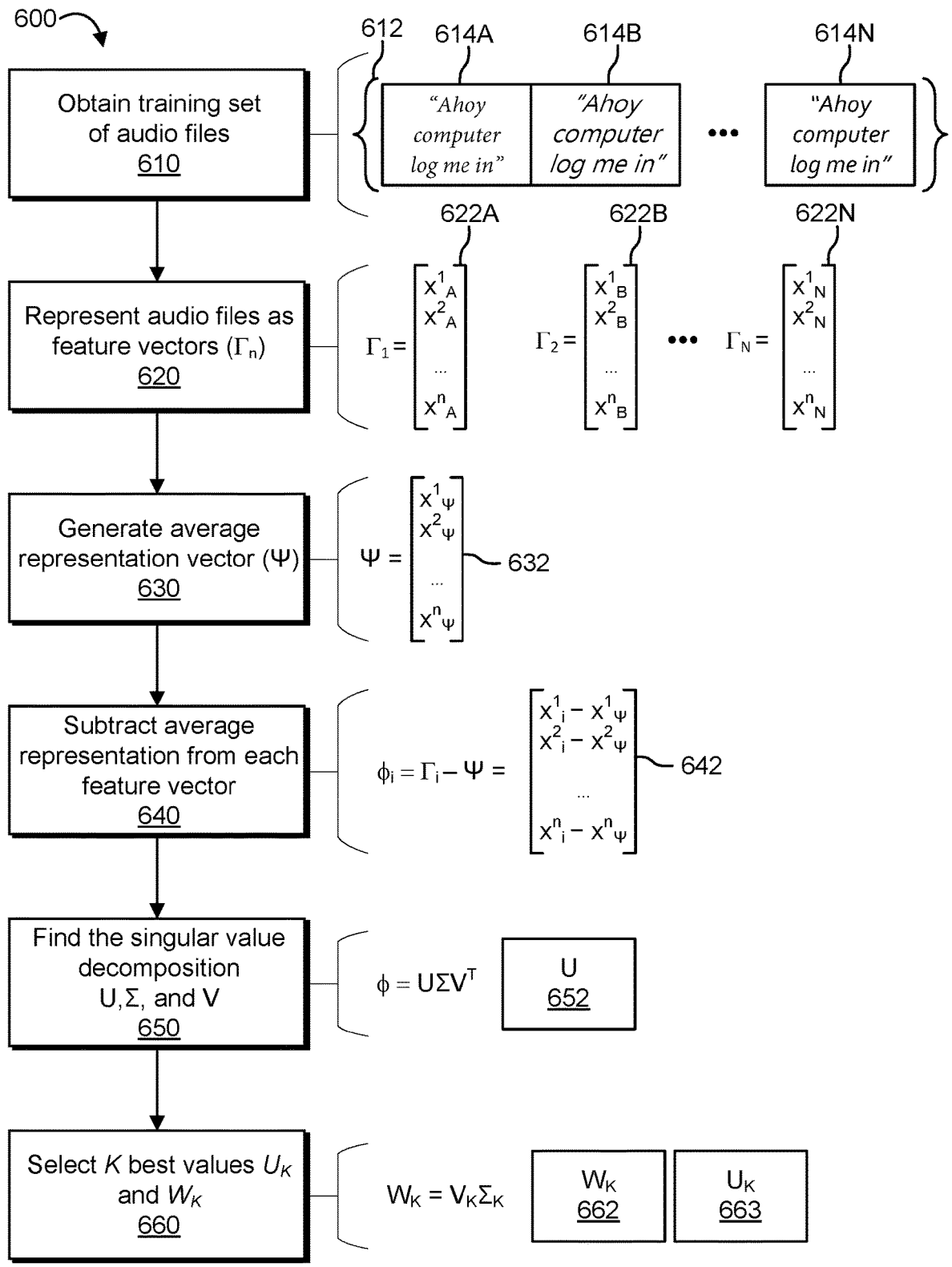
FIG. 6 illustrates an example process for creating a vector space model.

FIG. 6 illustrates an example process 600 for creating a vector space model (e.g., vector space model 200). In many examples, the process 600 is performed in whole or in part on the device 100, though in some examples the process 600 may be carried out elsewhere (e.g., carried out at server 1002 of FIG. 10), and the resulting vector space model is provided to the device 100 for use. The process begins with operation 610.

At operation 610, a training set 612 of audio clips is obtained. In an example, obtaining audio clips includes accessing one or more data structures or locations that store the audio clips or creating the audio clips from recordings, among other possibilities. The illustrated training set 612 includes multiple audio clips 614A, 614B, . . . , 614N (collectively audio clips 614) of utterances. The audio clips 614 can be obtained from multiple different sources in order to obtain a sufficiently large sample size to create a vector space representation. The use of multiple different audio sources representing a diverse background of voices facilitates the creation of a robust vector space. In many examples, the audio clips 614 include audio of a same text being vocalized (e.g., multiple different individuals saying the phrase "ahoy computer log me in"). In some examples, audio clips 614 of sound-alike phrases are obtained to provide a negative example. In an example, the training set 612 further includes multiple audio clips of recordings by the same source (e.g., the same user saying "ahoy computer log me in" multiple times).

At operation 620, the audio clips 614 are each represented as a feature vector 622A, 622B, . . . , 622N (collectively feature vectors 622) to form a plurality of feature vectors 622. In some examples, the training set 612 is already represented as feature vectors rather than raw audio clips. In other examples, the feature vectors 622 are generated based on the training set 612 obtained in operation 610. The feature vectors 622 can be generated in a variety of ways including but not limited to mel-frequency cepstrum representation of the audio clips 614 used to generate cepstral coefficients users features for processing. In other examples, mel-frequency cepstral coefficients, log filter banks, or other techniques are used. As illustrated, the feature vectors 622 each include n (designated by the superscript) feature value entries x.

At operation 630, an average representation vector 632 of the feature vectors 622 is generated. In an example, the average representation vector 632 is generated by taking an average of the feature vectors 622. Other statistical analyses are usable for creating the average representation vector 632, including statistical processes other than average.

At operation 640, the average representation vector 632 is subtracted from each of the feature vectors 622 to obtain a mean-centered result 642.

At operation 650, a singular value decomposition is performed based on the mean-centered result 642 of operation 640 to obtain all eigenvoices 652. In an example, the operation 650 includes performing singular value decomposition on the plurality of feature vectors 622 to obtain eigenvoices 652.

At operation 660, the K best eigenvoices 663 are selected from eigenvoices 652 and the K best eigenvalues 662 are also selected. The selecting of the K best eigenvoices 663, rather than using all of the eigenvoices 652, provides technical improvements by improving processing speed of future calculations and decreasing memory requirements by reducing the number of eigenvoices used to define a vector space. As K increases, resource demands increase along with the quality of the representation of voices within the vector space. In an example, the value K is selected to be sufficiently high to balance desired performance with desired quality, which varies on an application-by-application basis. The K best eigenvalues 662 are linear weights usable to reconstruct a voice or used in a matching process (e.g., to identify a voice input as being associated with a particular user).

As result of process 600, a vector space is created with which authentication or other processes can be performed. For instance, with reference to FIG. 2, values for the vector space metadata 210, the eigenvoices 220, and the average representation 230 of the vector space model 200 is known following the process 600. These values are stored, such as in the vector space data store 120.

Figure 7:
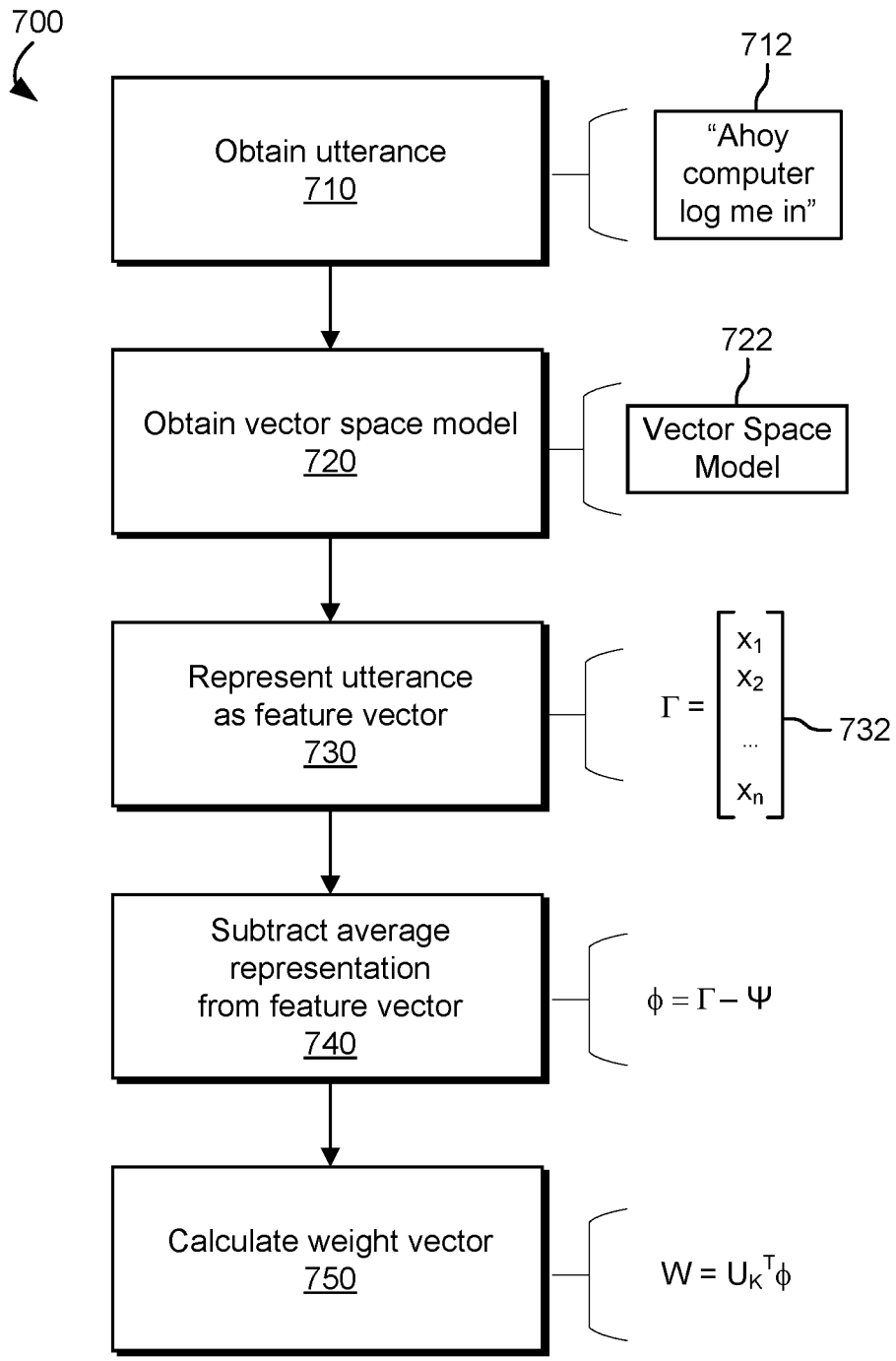
FIG. 7 illustrates an example process for projecting an obtained utterance onto a vector space.

FIG. 7 illustrates an example process 700 for projecting an obtained utterance onto a vector space, such as a vector space generated in FIG. 6 as result of process 600. The result of the process 700 includes a weight vector usable to define an entry in a vector space (e.g., entry 240 in vector space model 200) or that can be compared against such entries (e.g., as in operation 540 of FIG. 5). In an example, the process 700 is performed by the device 100. In other examples, the process 700 is performed in whole or in part on another device 100.

At operation 710, an utterance 712 is obtained. In the illustrated example, the utterance 712 is an utterance of the phrase "ahoy computer log me in". The utterance 712 may be obtained in a variety of ways. In an example, the utterance is obtained as a result of the execution of a log-me-in command, such as is described in retain to FIG. 4.

At operation 720, a vector space model 722 is obtained. In an example, the vector space model 722 is obtained from a vector space data structure, such as a data structure stored as part of the vector space data store 120 of FIG. 1. Various techniques are suitable for generating the vector space model 722, including process 600 of FIG. 6.

At operation 730, the utterance 712 is represented as a feature vector 732 using, for example, the techniques described previously in relation to operation 620 of FIG. 6.

At operation 740, an average representation associated with the vector space model 722 is subtracted from the feature vector 732 to create an output.

At operation 750 a weight vector is calculated from the output of operation 740 using the eigenvoices of the vector space model 722. In this manner, the weight vector defines a location within the vector space model 722 associated with the utterance 712. Thus the utterance 712 is projected onto the vector space model 722. In an example, vector-based operations are performed on the weight vector in order to perform various operations including providing user-specific services or access based on an utterance.

Figure 8:
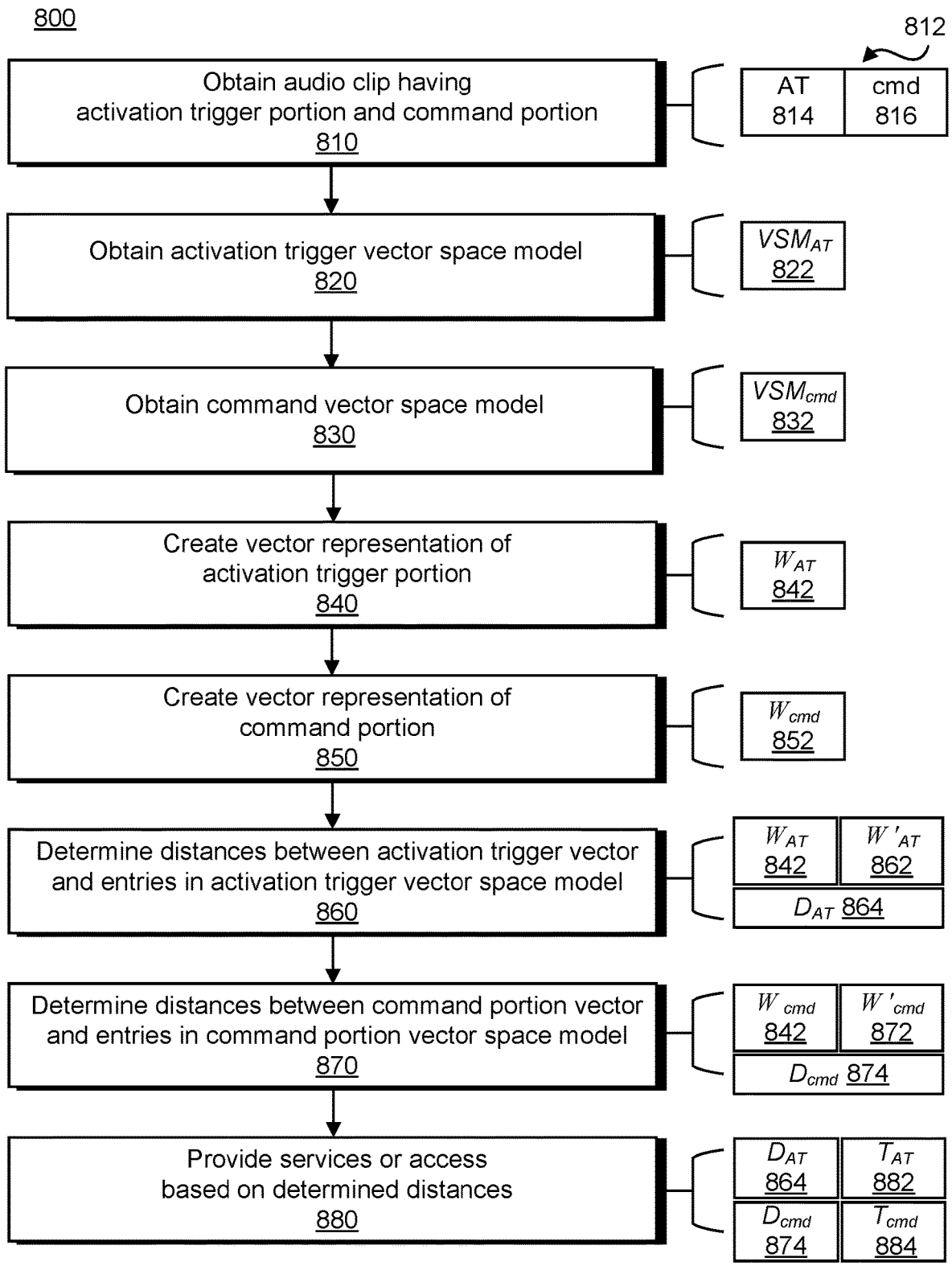
FIG. 8 illustrates an example process for providing user-specific services or access based on a vector space and multiple portions of an utterance.

The techniques described in FIGS. 6-8 are applicable to solving technical challenges involved in providing user-specific services or access based on an utterance. The examples described herein provide technical solutions to this computer-centric problem that enable improvement of the ability of device 100 to provide user-specific services or access based on an utterance, thereby providing an improved voice-based user interface. Rather than being directed to the general idea of authentication using voice, the examples described herein describe specific, non-generic technical schemes for providing user-specific services or access based on an utterance.

The use of vector space representations of registered utterances in evaluating whether a particular utterance is associated with a registered user can provide technical advantages in improving a voice-based user interface. Further improvements are provided by performing analysis not just on entire utterance but on discrete portions of the utterance.

In an example, a device 100 receives the utterance "ahoy computer log me in" and segments the utterance into a first portion and a second portion. The first portion corresponds to the activation trigger portion, "ahoy computer", and the second portion corresponds to the command portion, "log me in". The first and second portions are converted into vector space representations in an "ahoy computer" vector space and a "log me in" vector space, respectively. Then, the separate representations are compared against entries in the respective vector spaces to determine whether to provide services or access associated with an identified user.

By splitting an utterance into multiple portions for vector space processing, several technical advantages are achievable. Having multiple points of comparison can increase accuracy. For instance, rather than having just a single comparison in a single vector space, comparisons are made against multiple vector spaces. In this manner, the process becomes more robust to changes in how the sub portions are spoken. Multiple portions can also allow for the benefit of increased customizability by having multiple thresholds available for tweaking.

Splitting the utterance into multiple portions for processing can also improve a user experience by increasing flexibility. For instance, during registration a user provides the utterance "ahoy computer, log me in". Then, later, the user attempts to log in via the utterance "ahoy computer, sign me in". If there is not a sign-me-in vector space, the device could still obtain sufficient useful information to detect a registered user based on the "ahoy computer" (activation trigger) portion of the utterance. Other benefits will be apparent to one skilled in the art.

FIG. 8 illustrates an example process 800 for providing user-specific services or access based on a vector space and multiple portions of an utterance. In an example, the process 800 is performed at least in part by the device 100.

At operation 810 an audio clip of an utterance 812 is obtained. The utterance 812 includes an activation trigger portion 814 and a command portion 816. For instance, operation 810 includes obtaining, from the store 300, an audio clip having the utterance 812 having the activation trigger portion 814 and the command portion 816.

At operation 820, an activation trigger vector space model 822 is obtained. The activation trigger vector space model 822 includes one or more components as described in relation to the vector space model 200 of FIG. 2. The activation trigger vector space model 822 is obtained by, for example, loading the activation trigger vector space model 822 from a vector space data store (e.g., vector space data store 120). In other examples, the activation trigger vector space model 822 is generated from training data. In an example, the activation trigger vector space model 822 is selected from multiple possible vector space models based on the activation trigger portion 814 in the utterance 812. For instance, where the activation trigger portion 814 includes the phase "hey computer", the activation trigger vector space model 822 is selected from among other activation trigger vector space models in the vector space data store because the activation trigger vector space model 822 is created based on utterances of the phrase "hey computer". In another example, if the activation trigger portion 814 includes the phrase "ahoy computer", then a corresponding vector space model is selected and obtained from the vector space data store.

At operation 830, a command vector space model 832 is obtained. The command vector space model 832 includes one or more components as described in relation to the vector space model 200 of FIG. 2. The command vector space model 832 is obtained by, for example, loading the command vector space model 832 from a vector space data store (e.g., vector space data store 120). In other examples, the command vector space model 832 is generated from training data. In an example, the command vector space model 832 is selected from multiple possible command vector space models based on the command portion 816 of the utterance 812. For instance, where the command portion 816 includes the phrase "log me in", a command vector space model 832 that was trained or created in association with that phase is obtained in the vector space data store. In this manner, a different command vector space model 832 would be obtained where the command portion 816 includes the phrase "sign me in".

At operation 840, a vector representation of the activation trigger portion 814 (referred to as an activation trigger vector representation 842) is created, for example using one or more of the techniques described in relation to operation 620 of FIG. 6.

At operation 850, a vector representation of the command portion 816 (referred to as a command vector representation 852) is created, for example using one or more of the techniques described in relation to operation 620 of FIG. 6. In an example, the operation 850 includes creating the command vector representation 852 of the command portion 816) using one or more of the eigenvoices 652.

At operation 860, one or more distances are determined between the activation trigger vector representation 842 and entries 862 of the activation trigger vector space model 822. These one or more distances are referred to herein, individually and collectively, as activation trigger vector distances 864. In many examples, the entries 862 include entries of registered vectors of utterances of the activation trigger associated with particular users (e.g., registered users), which can be referred to as registered activation trigger vectors. In some examples, the entries 862 also include entries associated with unauthorized users (e.g., users not authorized to use the device 100). The activation trigger vector distances 864 are determinable using a variety of techniques, including but not limited to the calculation of Euclidian distance. In an example, the operation 860 includes determining the activation trigger vector distance 864 between the activation trigger vector representation 842 of the activation trigger portion 814 and a registered activation trigger vector. In an example, the operation 860 is performed at the device 100.

At operation 870, one or more distances are determined between the command vector representation 852 and entries 872 of the command vector space model 832. These one or more distances are referred to herein, individually and collectively, as command vector distances 874. In many examples, the entries 872 correspond to registered entries of vectors of utterances associated with particular users (e.g., authorized users), which can be referred to as registered command vectors. In some examples, the entries 872 also include entries associated with unauthorized users (e.g., users not authorized to use the device 100). The command vector distances 874 are determinable using a variety of techniques, including but not limited to the calculation of Euclidian distance. In an example, this operation 870 includes determining the command vector distance 874 between the command vector representation 852 of the command portion 816 and a registered command vector. In an example, the operation 870 is performed at the device 100.

Next, at operation 880, service or access is provided or enabled based on the activation trigger vector distance 864 and the command vector distance 874. In an example, the operation 880 includes responsive to the activation trigger vector distance 864 satisfying an activation trigger distance threshold 882 and the command vector distance 874 satisfying a command vector distance threshold 884, providing service or access associated with a registered user. In an example, the operation 880 includes obtaining credentials associated with the registered user from an account data store 118. This operation 880 can be implemented in a variety of ways. In a first example, each of the distances 864, 874 is compared to a respective threshold. For instance, the activation trigger vector distance 864 can be compared to an activation trigger distance threshold 882 and the command vector distance 874 can be compared to a command vector distance threshold 884. In an example, if both the activation trigger distance threshold 882 and command vector distance threshold 884 are satisfied, then the device 100 determines that a registered user spoke the utterance 812, and provides access or service associated with that registered user (e.g., as determined based on metadata associated with the entry on which that distance was based). In another example, only one of the thresholds (e.g., either activation trigger distance threshold 882 or command vector distance threshold 884) need be satisfied. In still another example, the relative satisfaction of the distance thresholds 882, 884 is used to determine authorization, such as a relatively small distance for one (e.g., the activation trigger vector distance 864 is very small) causing the threshold for the other to be relatively looser. This allows flexibility in the determination and an improved user experience. In an example, if the distance thresholds 882, 884 are satisfied, access may nonetheless be denied or restricted if the distances 864, 874 are for an unregistered entry (e.g., an entry associated with a user not authorized to use the device 100).

Registration

To facilitate providing user-specific services or access, a user may be required to go through a user registration process during which a user provides one or more utterances. The user may also provide account credentials or other account information that will be stored in association with the utterances or resulting entry in a vector space. The entries may be stored with a vector space model (e.g., as part of the vector space data store 120 of FIG. 1). The account credentials or other user-specific data can be stored in a data structure (e.g., the account data store 118 of FIG. 1) and may be encrypted.

Figure 9:
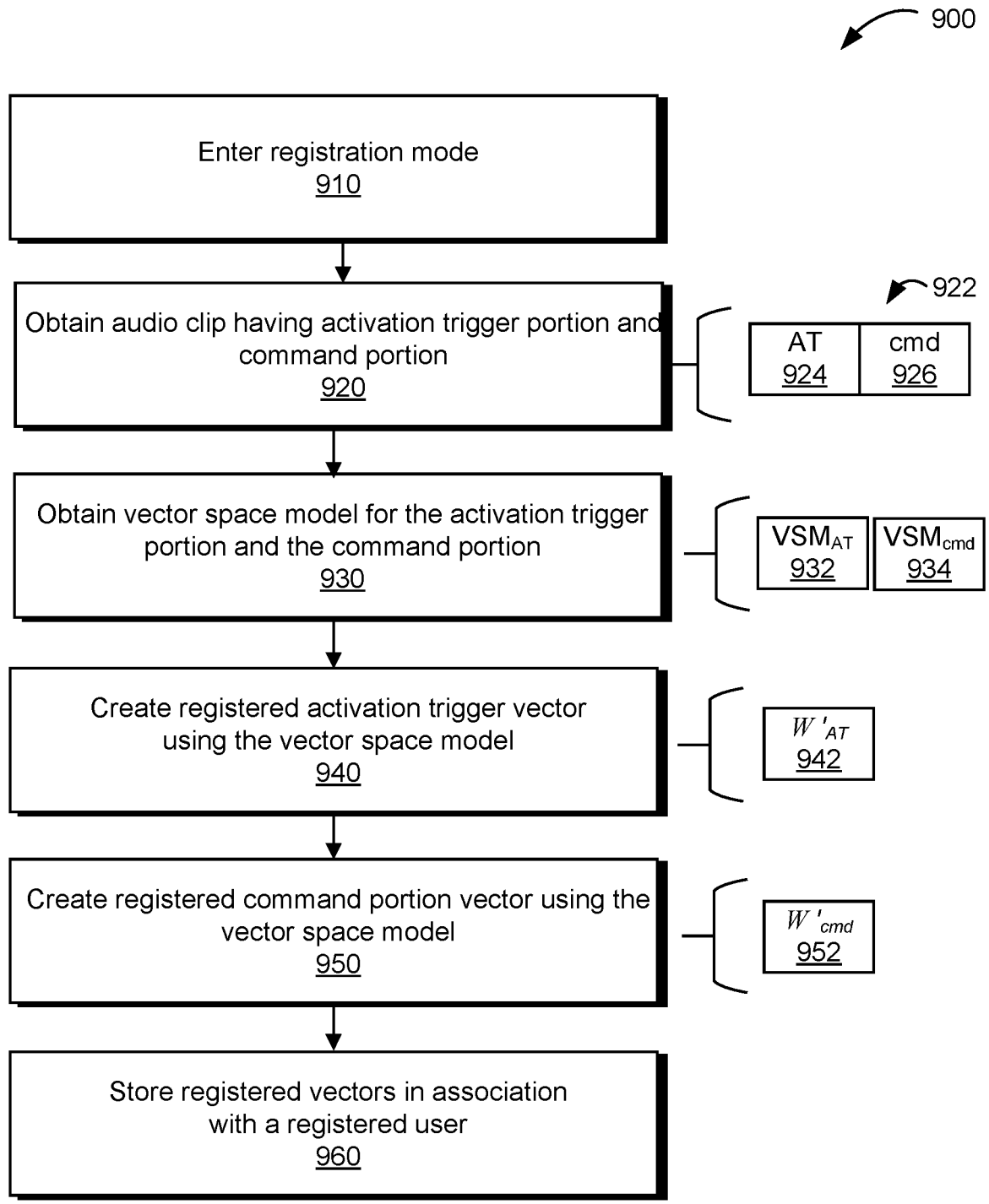
FIG. 9 illustrates example registration process for registering a user with a vector space.

FIG. 9 illustrates an example registration process 900 for registering a user with a vector space. For instance, the registration process 900 is usable for establishing entries associated with a vector space (e.g., one or more of the entries 862, 872 of FIG. 8).

At operation 910, a registration mode is entered. In an example, a user enters registration mode by activating a user interface element that corresponds to the registration process, such as by clicking a user interface element, tapping a user interface element, pressing a button, or providing an associated utterance, among other methods. In another example, the registration process is carried out during a setup of the device 100 for the first time. As part of entering the registration mode, the user may specify an account, log into an account, provide user-specific credentials, or provide a user identifier, among other methods. Such user information is associated with the user's entry in a vector space for later use.

At operation 920, a registration audio clip is obtained. The registration audio clip includes a registration utterance 922 that includes a registered activation trigger portion 924 and a registered command portion 926. In other examples, the registration utterance 922 includes a parameter portion or other portions. In an example, the device prompts the user (e.g., with visual or audio cues) to read certain text aloud or select text to read aloud (e.g., select from among multiple activation triggers and command phrases to read aloud), which is then captured for use. In an example, the options are based on the available vector space models (e.g., vector space models for predetermined the activation triggers, such as "ahoy computer", "hey computer", and "ahoy-hoy" are selectable for use). In an example, the operation 920 includes during a registration process, obtaining the registration audio clip having the registration utterance 922 from the registered user. In an example, the operation 920 includes segmenting the registration utterance 922 into the registered activation trigger portion 924 and the registered command portion 926.

At operation 930, an activation trigger vector space model 932 is obtained for the activation trigger and a command vector space model 934 is obtained for the command. In an example, the activation trigger vector space model 932 is obtained by accessing a data store that stores a vector space model (e.g., stored in vector space data store 120 on the device 100) associated with the registration utterance 922 or portions thereof.

For instance, where the activation trigger vector space model 932 is generated from utterances of the phrase "ahoy computer" and the command vector space model 934 is generated from utterances of the phrase "log me in", the user is prompted to speak the phrase "ahoy computer, log me in". In some instances, the user is prompted to select which phrase he or she wants to say to use as part of the authentication process.

At operation 940, a registered activation trigger vector 942 is created from the registered activation trigger portion 924 using the activation trigger vector space model 932. Various processes can be used to create the registered activation trigger vector 942, including a process at least similar to the process 600 described in FIG. 6.

At operation 950, a registered command vector 952 is created from the registered command portion 926 using the vector space model. Various processes can be used to create the registered command vector 952, including a process at least similar to the process 600 described in FIG. 6.

Next, the registered vectors 942, 952 are stored in association with a registered user in operation 960. For instance, the operation 960 includes storing the registered activation trigger vector 942 and storing the registered command vector 952. In an example, the registered activation trigger vector 942 and the registered command vector 952 are stored in the account data store 118 in association with an account of the authorized user.

Device Environment

Figure 10:
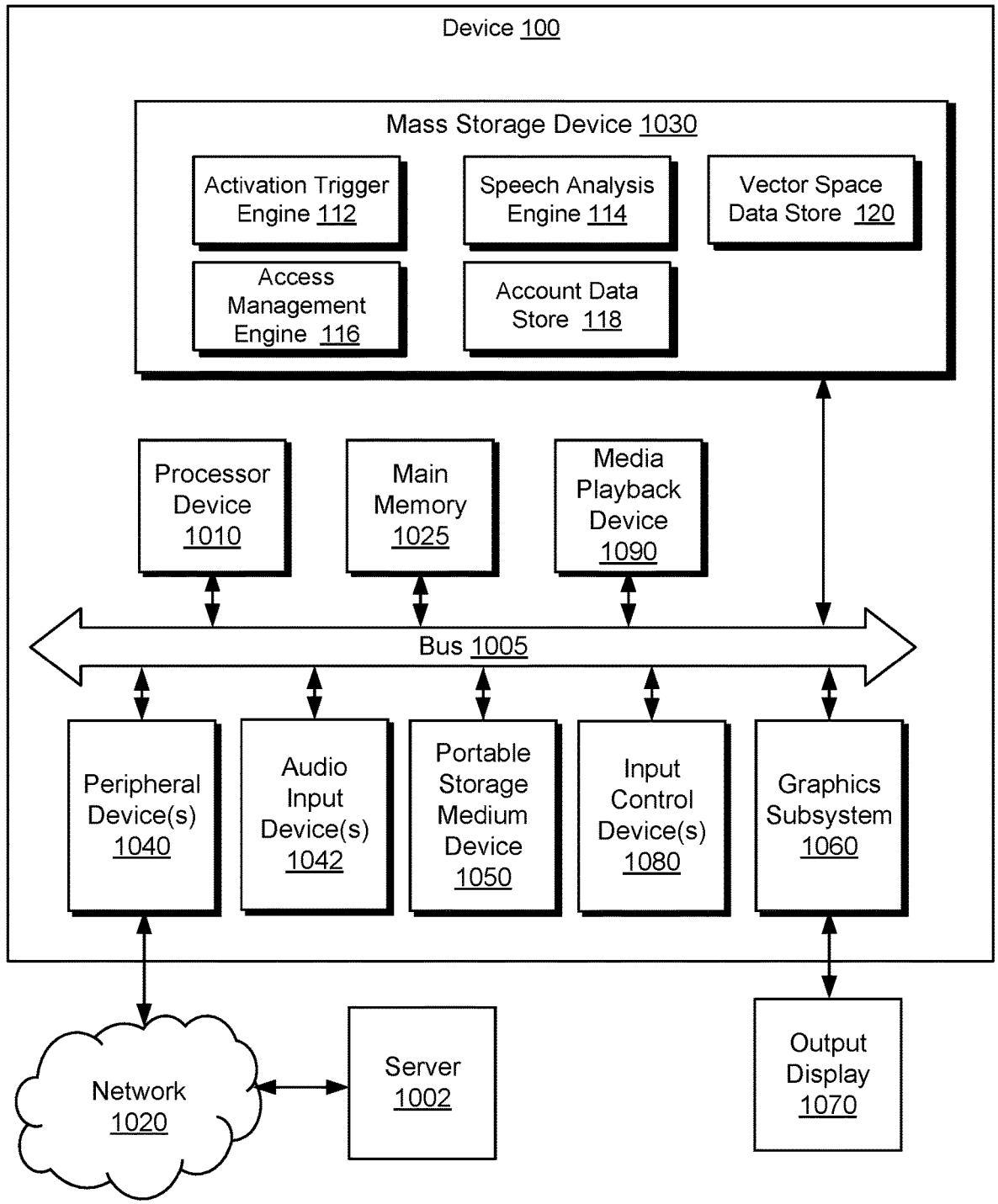
FIG. 10 is a block diagram showing an exemplary device constructed to realize one or more aspects of the example embodiments described herein.

FIG. 10 is a block diagram showing an exemplary device 100 constructed to realize one or more aspects of the example embodiments described herein.

As discussed above, the device 100 includes a processor device 1010. Also included are a main memory 1025 and an interconnect bus 1005. The processor device 1010 may include without limitation a single microprocessor, or may include a plurality of microprocessors for configuring the device 100 for providing user-specific services and access based on an utterance. The main memory 1025 stores, among other things, instructions and/or data for execution by the processor device 1010. The main memory 1025 may include banks of dynamic random access memory (DRAM), as well as cache memory.

The device 100 may further include a mass storage device 1030, peripheral device(s) 1040, audio input device(s) 1042, portable non-transitory storage medium device(s) 1050, input control device(s) 1080, a graphics subsystem 1060, and/or an output display 1070 interface. For explanatory purposes, all components in the device 100 are shown in FIG. 10 as being coupled via the bus 1005. However, the device 100 is not so limited. Elements of the device 100 may be coupled via one or more data transport means. For example, the processor device 1010, and/or the main memory 1025 may be coupled via a local microprocessor bus. The mass storage device 1030, peripheral device(s) 1040, portable storage medium device(s) 1050, and/or graphics subsystem 1060 may be coupled via one or more input/output (I/O) buses. The mass storage device 1030 may be a nonvolatile storage device for storing data and/or instructions for use by the processor device 1010. The mass storage device 1030 may be implemented, for example, with a magnetic disk drive or an optical disk drive. In a software embodiment, the mass storage device 1030 is configured for loading contents of the mass storage device 1030 into the main memory 1025. Memory may be embodied as one or more of mass storage device 1030, main memory 1025, or portable storage medium device 1050.

Mass storage device 1030 may additionally store one or more of the data structures, or function as one or more of the data stores described above. Mass storage device 1030 may also include software that, when executed, causes the device 100 to perform the features described above. In the illustrated example, the mass storage device 1030 stores the activation trigger engine 112, the speech analysis engine 114, the access management engine 116, the account data store 118, and the vector space data store 120.

The portable storage medium device 1050 operates in conjunction with a nonvolatile portable storage medium, such as, for example, a solid state drive (SSD), to input and output data and code to and from the device 100. In some embodiments, the software for storing information may be stored on a portable storage medium, and may be inputted into the device 100 via the portable storage medium device 1050. The peripheral device(s) 1040 may include any type of computer support device, such as, for example, an input/output (I/O) interface configured to provide additional functionality to the device 100. For example, the peripheral device(s) 1040 may include a network interface card for interfacing the device 100 with a network 1020. The audio input devices 1042 may be one or more devices configured to receive or obtain audio and to provide a representation of the audio (e.g., as an audio clip or file) as output. The audio input device(s) 1042 may include one or more microphones or other devices.

The input control device(s) 1080 provide a portion of an interface for the device 100. The input control device(s) 1080 may include a keypad and/or a cursor control device. The keypad may be configured for inputting alphanumeric characters and/or other key information. The cursor control device may include, for example, a handheld controller or mouse, a rotary input mechanism, a trackball, a stylus, and/or cursor direction keys. In order to display textual and graphical information, the device 100 may include the graphics subsystem 1060 and the output display 1070. The output display 1070 may include a display such as a TFT (Thin Film Transistor), TFD (Thin Film Diode), OLED (Organic Light-Emitting Diode), AMOLED (active-matrix organic light-emitting diode) display, and/or liquid crystal-type displays (LCD). The displays can also be touchscreen displays, such as capacitive and resistive-type touchscreen displays.

The graphics subsystem 1060 receives textual and graphical information, and processes the information for output to the output display 1070.

Input control devices 1080 can control the operation and various functions of device 100. Input control devices 1080 can include any components, circuitry, or logic operative to drive the functionality of device 100. For example, input control device(s) 1080 can include one or more processors acting under the control of an application.

Each component of the device 100 may represent a broad category of a computer component of a general and/or special purpose computer. Components of the device 100 are not limited to the specific implementations provided herein.

Software embodiments of the examples presented herein may be provided as a computer program product, or software, that may include an article of manufacture on a machine-accessible or machine-readable medium having instructions. The instructions on the non-transitory machine-accessible, machine-readable or computer-readable medium may be used to program a computer system or other electronic device. The machine- or computer-readable medium may include, but is not limited to, magnetic disks, optical disks, magneto-optical disks, or other types of computer-/machine-readable media suitable for storing or transmitting electronic instructions. The techniques described herein are not limited to any particular software configuration. They may find applicability in any computing or processing environment. The terms "computer-readable", "machine-accessible medium" or "machine-readable medium" used herein shall include any medium that is capable of storing, encoding, or transmitting a sequence of instructions for execution by the machine, and which causes the machine to perform any one of the methods described herein. Further, it is common in the art to speak of software, in one form or another (e.g., program, procedure, process, application, module, unit, logic, and so on), as taking an action or causing a result. Such expressions are merely a shorthand way of stating that the execution of the software by a processing system causes the processor to perform an action to produce a result.

Some embodiments may also be implemented by the preparation of application-specific integrated circuits, field-programmable gate arrays, or by interconnecting an appropriate network of conventional component circuits.

Some embodiments include a computer program product. The computer program product may be a storage medium or media having instructions stored thereon or therein that can be used to control or cause a computer to perform any of the procedures of the example embodiments of the invention. The storage medium may include, without limitation, an optical disc, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer-readable medium or media, some implementations include software for controlling both the hardware of the system and for enabling the system or microprocessor to interact with a human user or other mechanism utilizing the results of the example embodiments of the invention. Such software may include, without limitation, device drivers, operating systems, and user applications. Ultimately, such computer-readable media further include software for performing example aspects of the invention, as described above.

Included in the programming and/or software of the system are software modules for implementing the procedures described above.

The device 100 may be connected over the network 1020 to one or more servers 1002 or other remote devices. The one or more servers 1002 can include one or more components described above in relation to device 100, including a mass storage device and a processor device.

Various operations and processes described herein can be performed by the cooperation of two or more devices, systems, processes, or combinations thereof.

Figure 11:
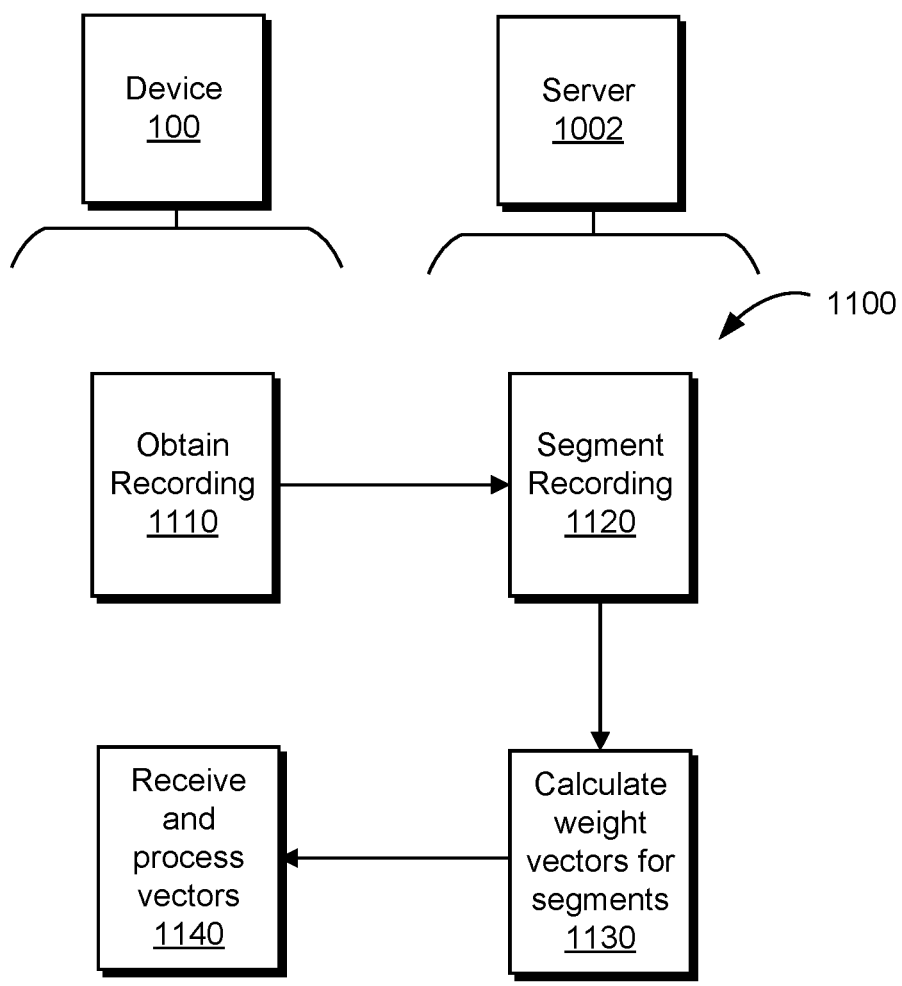
FIG. 11 illustrates an example division of operations between the device and the server.

FIG. 11 illustrates an example division of operations of a method 1100 between the device 100 and the server 1002. This division of operations facilitates efficient use of computing resources, because servers are generally more powerful than the device 100. Whereas the device 100 is likely comparatively less powerful but more portable, closer to the user, having lower latency or other desirable properties. At operation 1110, the device 100 obtains a recording (see, e.g., operations 510, 710, and 810). The device 100 then sends the recording to the server 1002. In an example, the operation 1110 includes the device 100 providing the audio clip having the utterance (e.g., utterance 302 or utterance 812) to the server 1002, and the server 1002 receiving the audio clip having the utterance from the device (100) over the network 1020. At operation 1120, the server 1002 segments the recording into multiple portions. In an example, the server 1002 segments the recording into an activation trigger portion, a command portion, and a parameter portion. In an example, the operation 1120 includes segmenting the audio clip into the activation trigger portion and the command portion. In another example, the server 1002 segments the recording into words, syllables, phonemes, or other divisions. Segmenting the recording is a relatively resource intensive task suitable for performance by the server 1002. At operation 1130, the server 1002 calculates weight vectors for each of the segments (see, e.g., operations 530, 730, 840, and 850). The weight vectors are then sent to the device 100. In an example, the operation 1130 includes creating the activation trigger vector representation 842 of the activation trigger portion from the activation trigger portion; creating the command vector representation 852 of the command portion from the command portion; and providing the activation trigger vector representation 842 and the command vector representation 852 to the device 100. At operation 1140, the device 100 receives and processes the weight vectors, such as by performing a comparison using the weight vectors (see, e.g., operations 540, 860, and 870), storing the weight vectors, or performing another operation. In an example, the operation 1140 includes receiving the activation trigger vector representation 842 of the activation trigger portion 814 from the server 1002. In an example, the operation 1140 further includes receiving the command vector representation 852 of the command portion 816 from the server 1002.

While various example embodiments of the present invention have been described above, it should be understood that they have been presented by way of example, not limitation. It will be apparent to persons skilled in the relevant art(s) that various changes in form and detail can be made therein. Thus, the present invention should not be limited by any of the above-described example embodiments, but should be defined only in accordance with the following claims and their equivalents. Further, the Abstract is not intended to be limiting as to the scope of the example embodiments presented herein in any way. It is also to be understood that the procedures recited in the claims need not be performed in the order presented.

The invention claimed is:

1. A method comprising:
   obtaining, from a store, an audio clip having an utterance having an activation trigger portion and a command portion;

selecting an activation trigger vector space model from multiple available activation trigger vector space models based on the activation trigger portion;
creating an activation trigger vector representation of the activation trigger portion using the activation trigger vector space model and one or more eigenvoices;
determining an activation trigger vector distance in a vector space between the activation trigger vector representation of the activation trigger portion and a registered activation trigger vector associated with a registered user;
determining a command vector distance in the vector space between a command vector representation of the command portion and a registered command vector associated with the registered user; and
responsive to the activation trigger vector distance satisfying an activation trigger distance threshold and the command vector distance satisfying a command vector distance threshold, providing service or access associated with the registered user.

2. The method of claim 1, further comprising:
during a registration process, obtaining a registration audio clip having a registration utterance from the registered user;
segmenting the registration utterance into a registered activation trigger portion and a registered command portion;
creating the registered activation trigger vector from the registered activation trigger portion;
creating the registered command vector from the registered command portion; and
storing the registered activation trigger vector and the registered command vector in association with the registered user.

3. The method of claim 1, wherein obtaining the audio clip having the utterance includes:
monitoring an output from an audio input device; and
responsive to the output matching an activation trigger pattern, creating the audio clip having the utterance.

4. The method of claim 1, further comprising:
storing the registered activation trigger vector
storing the registered command vector;
providing the audio clip having the utterance to a server;
receiving the activation trigger vector representation of the activation trigger portion from the server; and
receiving the command vector representation of the command portion from the server.

5. The method of claim 1, wherein providing service or access associated with the registered user includes obtaining credentials associated with the registered user from an account data store.

6. The method of claim 1, further comprising:
receiving the audio clip having the utterance from a device over a network.

7. The method of claim 6, wherein providing service or access associated with the registered user includes providing credentials to the device.

8. The method of claim 6, further comprising segmenting the audio clip into the activation trigger portion and the command portion.

9. The method of claim 8, further comprising:
creating the activation trigger vector representation of the activation trigger portion from the activation trigger portion; and
creating the command vector representation of the command portion from the command portion.

10. The method of claim 9, further comprising:
providing the activation trigger vector representation and the command vector representation to the device.

11. The method of claim 10,
wherein the determining the activation trigger vector distance is performed at the device; and
wherein the determining the command vector distance is performed at the device.

12. The method claim 1, further comprising:
selecting a command vector space model from multiple possible vector space models based on the command portion in the utterance; and
creating the command vector representation using the command vector space model and one or more eigenvoices.

13. A system comprising:
one or more processors; and
a computer-readable medium coupled to the one or more processors and comprising instructions thereon that, when executed by the one or more processors, cause the one or more processors to:
obtain an audio clip having an utterance having an activation trigger portion and a command portion;
select an activation trigger vector space model from multiple available activation trigger vector space models based on the activation trigger portion;
create an activation trigger vector representation of the activation trigger portion using the activation trigger vector space model and one or more eigenvoices;
determine an activation trigger vector distance in a vector space between the activation trigger vector representation of the activation trigger portion and a registered activation trigger vector associated with a registered user;
determine a command vector distance in the vector space between a command vector representation of the command portion and a registered command vector associated with the registered user; and
responsive to the activation trigger vector distance satisfying an activation trigger distance threshold and the command vector distance satisfying a command vector distance threshold, provide service or access associated with the registered user.

14. The system of claim 13, wherein the instructions, when executed by the one or more processors, further cause the one or more processors to:
select a command vector space model from multiple available vector space models based on the command portion in the utterance; and
create the command vector representation using the command vector space model and one or more eigenvoices.

15. The system of claim 13, wherein the instructions, when executed by the one or more processors, further cause the one or more processors to:
obtaining a training set;
representing the training set as feature vectors to form a plurality of feature vectors;
performing singular value decomposition on the plurality of feature vectors to obtain the eigenvoices;
creating the activation trigger vector representation of the activation trigger portion using one or more of the eigenvoices; and
creating the command vector representation of the command portion using one or more of the eigenvoices.

16. The system of claim 13, further comprising:

a smart audio appliance for providing user-specific audio services based on a received utterance, the smart audio appliance comprising:

the one or more processors;

the computer-readable medium;

a media playback device; and an audio input device.

17. A method comprising:

receiving, from a device, an audio clip having an utterance;

segmenting the utterance into an activation trigger portion and a command portion;

creating an activation trigger vector representation of the activation trigger portion using a first vector space model and eigenvoices associated with the first vector space model;

creating a command vector representation of the command portion using a second vector space model and eigenvoices associated with the second vector space model;

determining an activation trigger vector distance in a vector space between the activation trigger vector representation of the activation trigger portion and a registered activation trigger vector associated with a registered user;

determining a command vector distance in the vector space between a command vector representation of the command portion and a registered command vector associated with the registered user; and providing service or access associated with a registered user based on the activation trigger vector distance and the command vector distance.

18. The method of claim 17, further comprising:

transmitting the activation trigger vector representation and the command vector representation to the device.

* * * * *

UNITED STATES PATENT AND TRADEMARK OFFICE
CERTIFICATE OF CORRECTION

PATENT NO. : 11,170,787 B2
APPLICATION NO. : 16/278305
DATED : November 9, 2021
INVENTOR(S) : Bromand Page 1 of 1

It is certified that error appears in the above-identified patent and that said Letters Patent is hereby corrected as shown below:

In the Drawings

FIGURE 8:

To the right of Block 870, " $\underline{W_{cmd''} \ 842}$ " should read -- $\underline{W_{cmd''} \ 852}$ --.

In the Specification

Column 21:
Line 41, "vector" should read --vector;--.

In the Claims

Column 22:
Line 9, "method claim" should read --method of claim--.

Signed and Sealed this
Eighteenth Day of January, 2022

Drew Hirshfeld
*Performing the Functions and Duties of the
Under Secretary of Commerce for Intellectual Property and
Director of the United States Patent and Trademark Office*